(No Model.)

W. M. REED.
NUT LOCK.

No. 508,757. Patented Nov. 14, 1893.

Witnesses:
J. B. McGiver
Ronard H. Dyer

Inventor:
William M. Reed
by Francis L. Dyer,
Attorney

United States Patent Office.

WILLIAM M. REED, OF BELLAIRE, OHIO, ASSIGNOR OF ONE-FOURTH TO JOHN W. ROBB, OF WHEELING, WEST VIRGINIA.

NUT-LOCK.

SPECIFICATION forming part of Letters Patent No. 508,757, dated November 14, 1893.

Application filed June 17, 1893. Serial No. 477,911. (No model.)

*To all whom it may concern:*

Be it known that I, WILLIAM M. REED, a citizen of the United States, residing at Bellaire, in the county of Belmont and State of Ohio, have invented certain new and useful Improvements in Nut-Locks; and I do hereby declare the following to be a full, clear, and exact description of the invention, which will enable others skilled in the art to which it appertains to make and use the same.

My present invention relates to various new and useful improvements in nut-locks, which are to be used principally for locking the nuts of the bolts, which are employed for securing fish-plates to railroad rails, it being understood of course, that my improvement may be used in connection with any and all nuts, for any purpose whatsoever.

My invention relates to that class of nut locks, wherein a washer is used to lock the nut on the bolt, and the improvement therein consists in providing a washer for this purpose of a peculiar form, which has certain advantages, and in preventing said washer from turning on the fish-plate, in a novel manner, which is also advantageous.

The objects of my invention are, to produce a nut-lock, which can be manufactured cheaply, which can be easily applied to the bolt, and which will serve its end in an effective manner.

The construction of my improved nut-lock, and the manner of applying the same in use, will be readily understood, from an inspection of the accompanying drawings, and a perusal of the description which follows.

Figure 1:
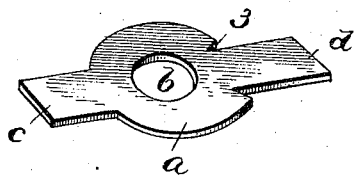
Figure 2:
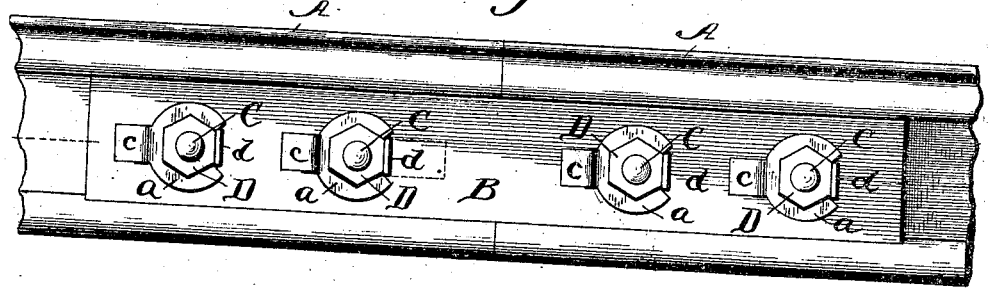

In the said drawings, which form a part of this specification: Figure 1, is a perspective view of the blank or washer before the same is bent into its operative shape; Fig. 2, a side elevation of a portion of two railroad rails, at the joint thereof, showing the fish-plate in position, with the nuts on the bolts thereof, locked by my improved nut-locks, and Fig. 3, a sectional view, and Fig. 4, a perspective view of the blank ready to be placed on the fish-plate.

In all of the above views, corresponding parts are designated by the same letters and numerals of reference.

Figure 3:
Figure 4:
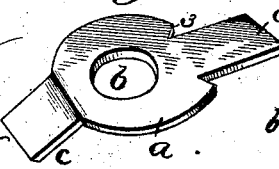

Referring to Figs. 2 and 3, A, A, are two railroad rails, abutting together.

B, B, are the usual fish-plates; C, C, are bolts, passing through the said fish-plates and rails.

D, D, are nuts on said bolts, which nuts are to be locked, *i. e.*, kept from turning on said bolts, and loosening, by my improved nut-lock, shown particularly in Fig. 1. This nut-lock consists of a washer, which is to be inserted between one of the fish-plates B, and each of the nuts D, and engaging with said nuts. The said washer, is to be stamped or otherwise formed out of sheet metal, such as soft Bessemer steel, having sufficient elasticity to properly fulfill the necessary functions thereof, to be presently pointed out. The said washer, has a body portion, $a$, of sufficient diameter to be borne upon by nuts of different sizes, and is provided at its center, with a hole, $b$, through which passes the bolt C. On one side of the body, $a$, integral therewith, is a lug or ear $c$, by which the washer will be locked on to the fish-plate, and on the other side of the body $a$, and also integral therewith, is another lug or ear $d$, for locking the nut, D. It will be observed that the lug or ear, $d$, extends out from the body $a$, from a point some distance in from the periphery thereof, or in other words, that the body $a$, is cut away at 3, on each side of the lug or ear, $d$, by which said lug will be longer than the lug or ear, $c$. In this manner, the lug or ear, $d$, may be turned up to lock nuts, which have a diameter, either greater or smaller than the body $a$. In practice if desired, the lug or ear $c$, may be made in the same manner as the lug or ear, $d$, by means of which a washer will be obtained which will be perfectly symmetrical in shape, having the advantages, that the washer can be made easier, and can be applied with greater facility, since both lugs, $c$, and $d$, will be the same, and mistakes cannot be made as to which lug should be bent in one way, and which lug in the other.

A washer having been constructed as I have just explained, it is applied to use, in the following manner: The lug or ear $c$, having been first provided with a downward bend, (see left hand part of Fig. 3) the body $a$, is inserted over the bolt, C. The lug or ear c, will engage with a shallow groove f, formed in the fish-plate, by any suitable gouging tool or punch. The nut, D, is now turned down upon the bolt C, engaging with the body a, and bringing the washer flat down upon the fish-plate, against the tension of the lug or ear, c, which will be always kept in firm engagement with the groove, f, thereby keeping the washer from turning. When the nut, D, has been screwed down as tightly as possible, a flat instrument, such as a chisel, is inserted under the lug or ear, d, which is thereby bent up at right angles to the body, a, and rests against one of the faces of the nut, (see right hand part of Fig. 3.)

When the washer is made of moderately thin, or comparatively soft metal, the lug or ear, d, can be bent up by hand. It will be seen from the above description, that the lug or ear, c, prevents the washer from turning, and that the lug or ear, d, engaging with one of the faces of the nuts, will serve as a simple and effective lock for the same.

While I have specified in the above description, that the washer can be made of soft Bessemer steel, which is desirable, on account of its flexible nature, I nevertheless do not wish to be limited thereto, since other metals may be employed for that purpose.

I am familiar with Letters Patent of the United States, No. 272,971, dated February 27, 1883, to Joel Moored, and I do not claim broadly anything disclosed therein; but What I do claim, and desire to secure to myself, is the following:

1. As an improvement in nut locks, a washer, composed of a body portion, a, mounted upon the bolt, and engaged by the nut; a spring lug or ear, c, thereon, bent downward, and engaging a groove, f, in the fish-plate and held in said groove, under tension, by the nut when screwed home, and a lug or ear d, on said body, bent up and engaging one of the faces of said nut, substantially as set forth.

2. As an improvement in nut-locks, a washer, composed of a body portion, a, mounted upon the bolt, and engaged by the nut; a spring lug or ear, c, thereon, bent downward and engaging a groove, f, in the fish-plate and held in said groove under tension, by the nut; and a lug or ear d, extending out from said body, from a point within the periphery thereof, and bent up and engaging one of the faces of said nut, substantially as set forth.

In testimony whereof I affix my signature in presence of two witnesses.

W. M. REED.

Witnesses:
JOHN R. GOW,
W. B. KILLGORE.